(12) United States Patent
Ma

(10) Patent No.: US 6,393,360 B1
(45) Date of Patent: May 21, 2002

(54) SYSTEM FOR AUTOMATICALLY LOCATING AND DIRECTING A VEHICLE

(76) Inventor: Erjian Ma, 905 W. Thach Ave., Apt 1, Auburn, AL (US) 36832

( * ) Notice: Subject to any disclaimer, the term of this patent is extended or adjusted under 35 U.S.C. 154(b) by 0 days.

(21) Appl. No.: 09/442,232

(22) Filed: Nov. 17, 1999

(51) Int. Cl.⁷ .............................................. G06F 17/00
(52) U.S. Cl. ........................ 701/208; 701/117; 340/905
(58) Field of Search ................................... 701/200, 117, 701/207, 208; 340/905, 988, 995

(56) References Cited

U.S. PATENT DOCUMENTS

| | | | |
|---|---|---|---|
| 4,514,810 A | 4/1985 | Ito et al. | |
| 4,688,176 A | 8/1987 | Hirata | |
| 5,031,104 A | 7/1991 | Ikeda et al. | |
| 5,187,810 A | * 2/1993 | Yoneyama et al. | 455/509 |
| 5,257,023 A | * 10/1993 | Furuya | 340/995 |
| 5,289,183 A | * 2/1994 | Hassett et al. | 340/905 |
| 5,331,561 A | 7/1994 | Barrett et al. | |
| 5,355,316 A | 10/1994 | Knobbe | |
| 5,410,485 A | 4/1995 | Ichikawa | |
| 5,448,479 A | 9/1995 | Kemner et al. | |
| 5,487,002 A | 1/1996 | Diller et al. | |
| 5,488,558 A | 1/1996 | Ohki | |
| 5,550,742 A | 8/1996 | Furuya et al. | |
| 5,586,030 A | 12/1996 | Kemner et al. | |
| 5,666,109 A | * 9/1997 | Fukui et al. | 340/905 |
| 5,845,228 A | 12/1998 | Uekawa | |
| 5,856,802 A | 1/1999 | Ura et al. | |
| 5,900,825 A | * 5/1999 | Pressel et al. | 340/905 |
| 5,953,672 A | * 9/1999 | Lengdell et al. | 455/517 |

* cited by examiner

*Primary Examiner*—William A. Cuchlinski, Jr.
*Assistant Examiner*—Edward Pipala

(57) ABSTRACT

This is a method and apparatus for giving an accurate vehicle location and route from one location to a desired destination. This is done by catching signals from a fixed local information source through a receiver system placed in the vehicles. The present invention is called LPS (Local Position System) navigation system because it is based on a local information system instead of getting information from a satellite or city beacon. This system has two main units. The first of these units is the Address Code, this is an emitter or carrier which is placed on roads all over the nation. This unit can provide digitized and standardized road information. The second of these units is the Receiver, which can receive signals on the road and search them in a database. This database is set in the vehicle and tells the accurate location of the vehicle. It then can give precise directions to a location based on user's input. Therefore, a system user will know where he is and exactly how to get where he wants to go. The system user can transmit the received signal to his headquarters or to people with the same equipment.

16 Claims, 8 Drawing Sheets

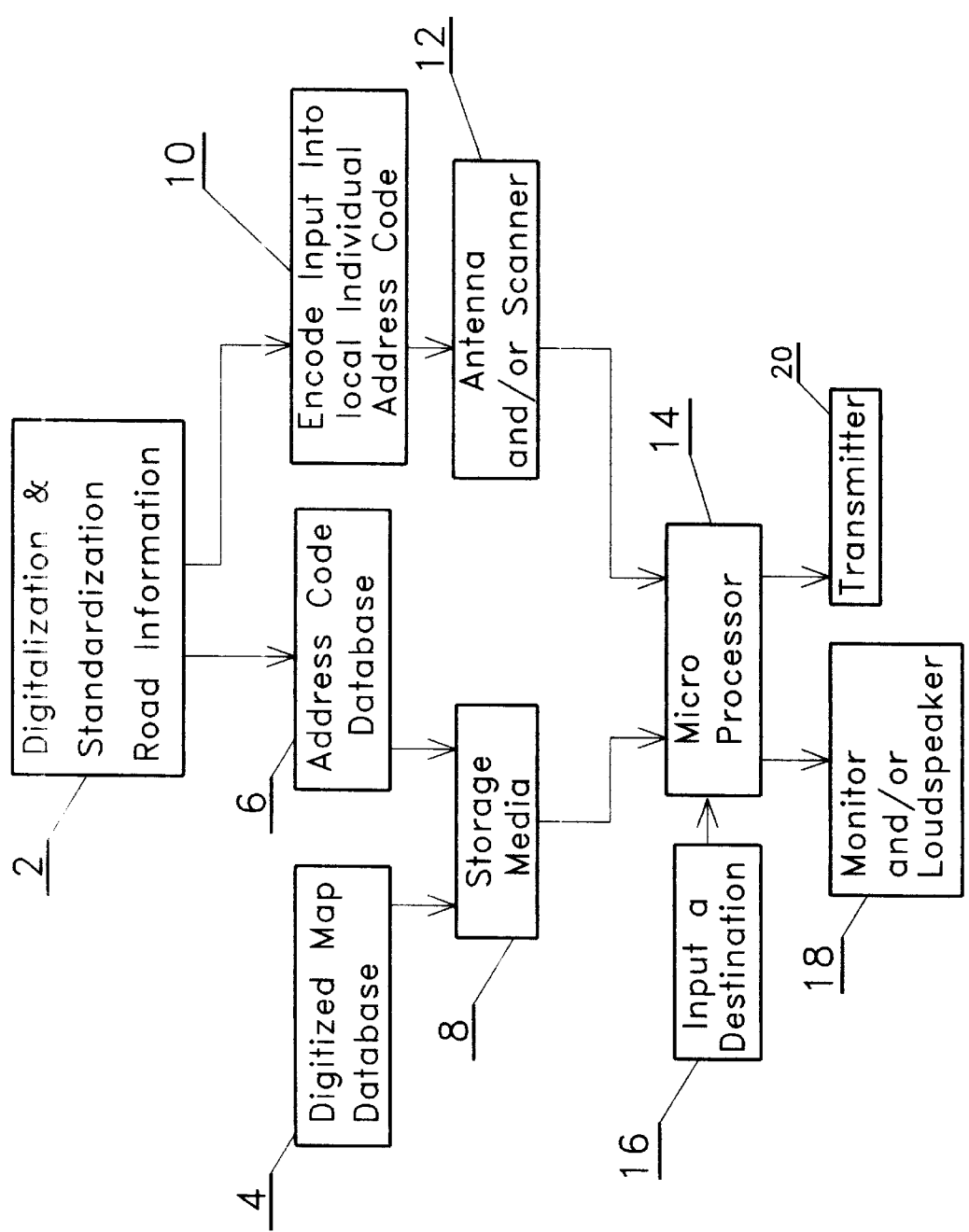
FIG. 1 Flow Chart of Principle Local Position System

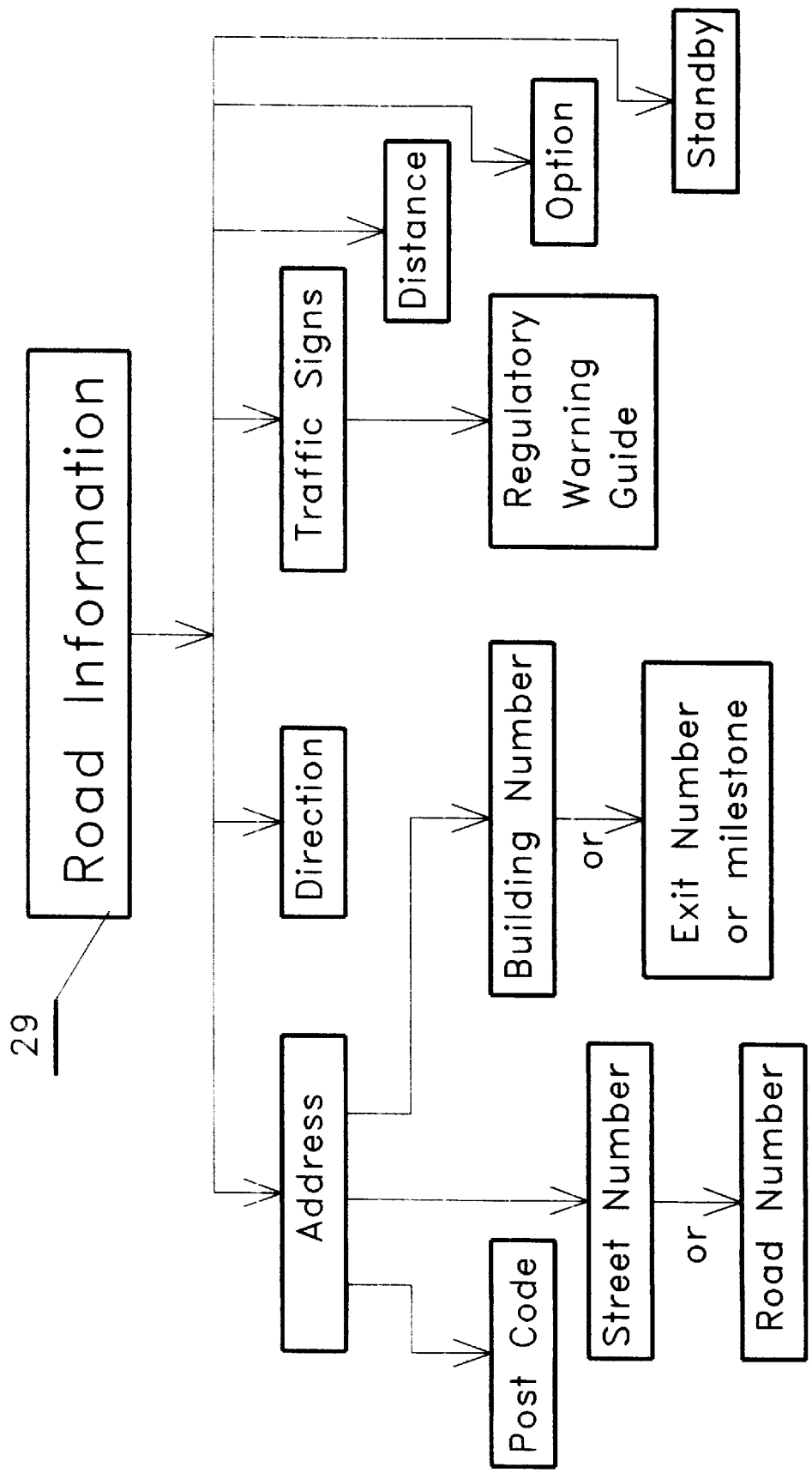
FIG. 2  Road Information Content

FIG. 3 Digitization Road information

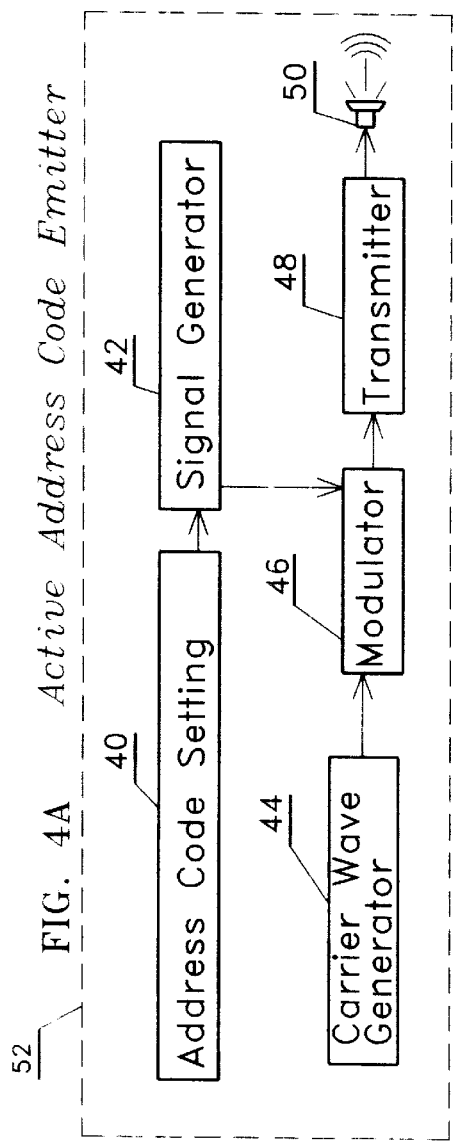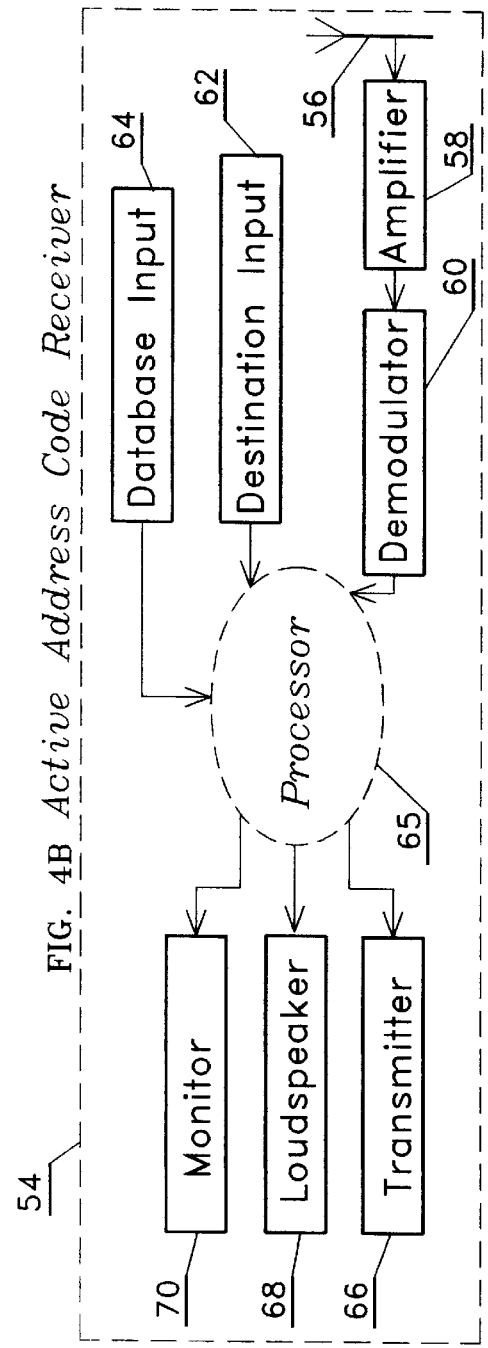
FIG. 4 Scheme of Principle of Active Address Code Emitter and Receiver

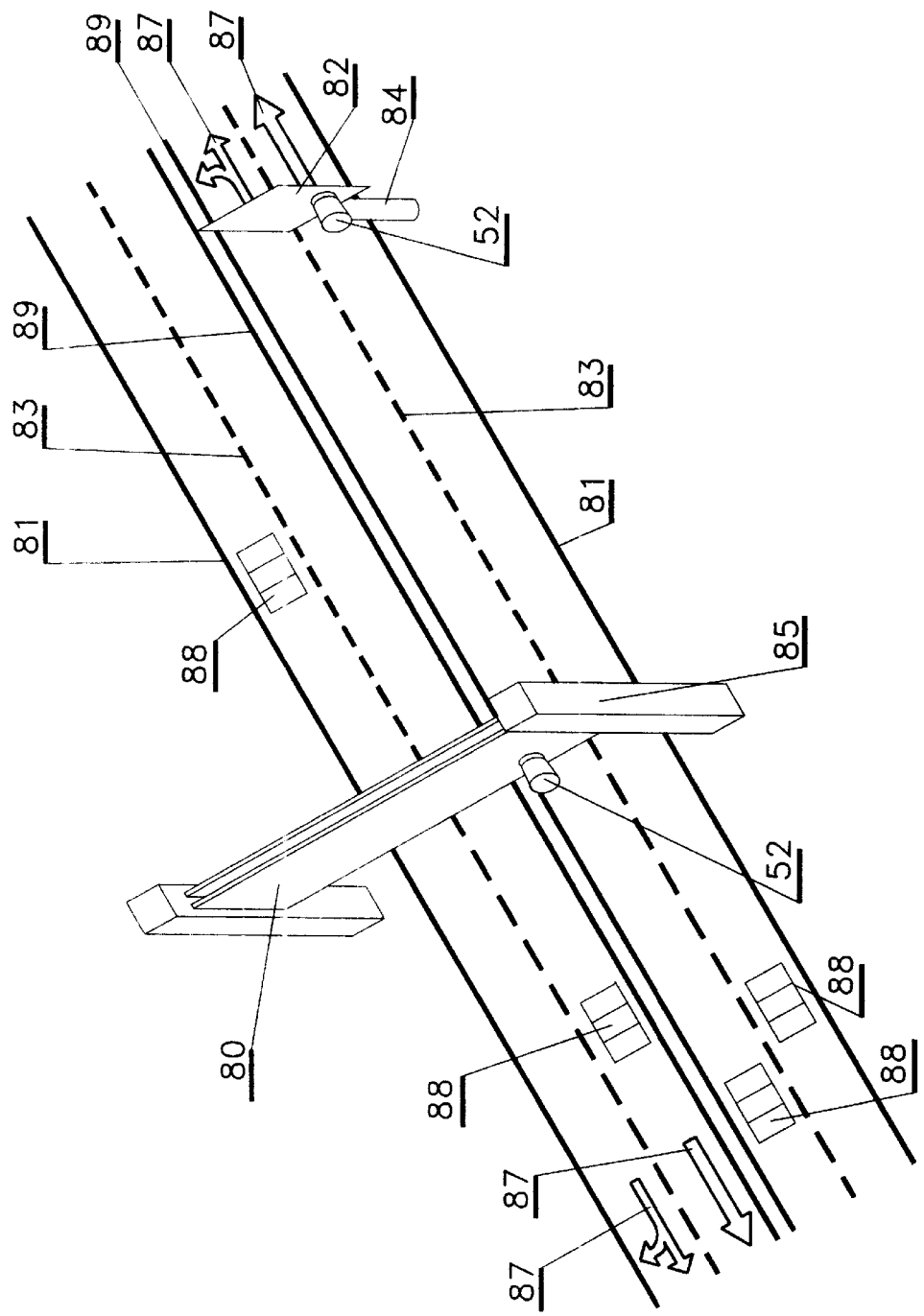
FIG.5 Scheme of Active Signal Address Code System

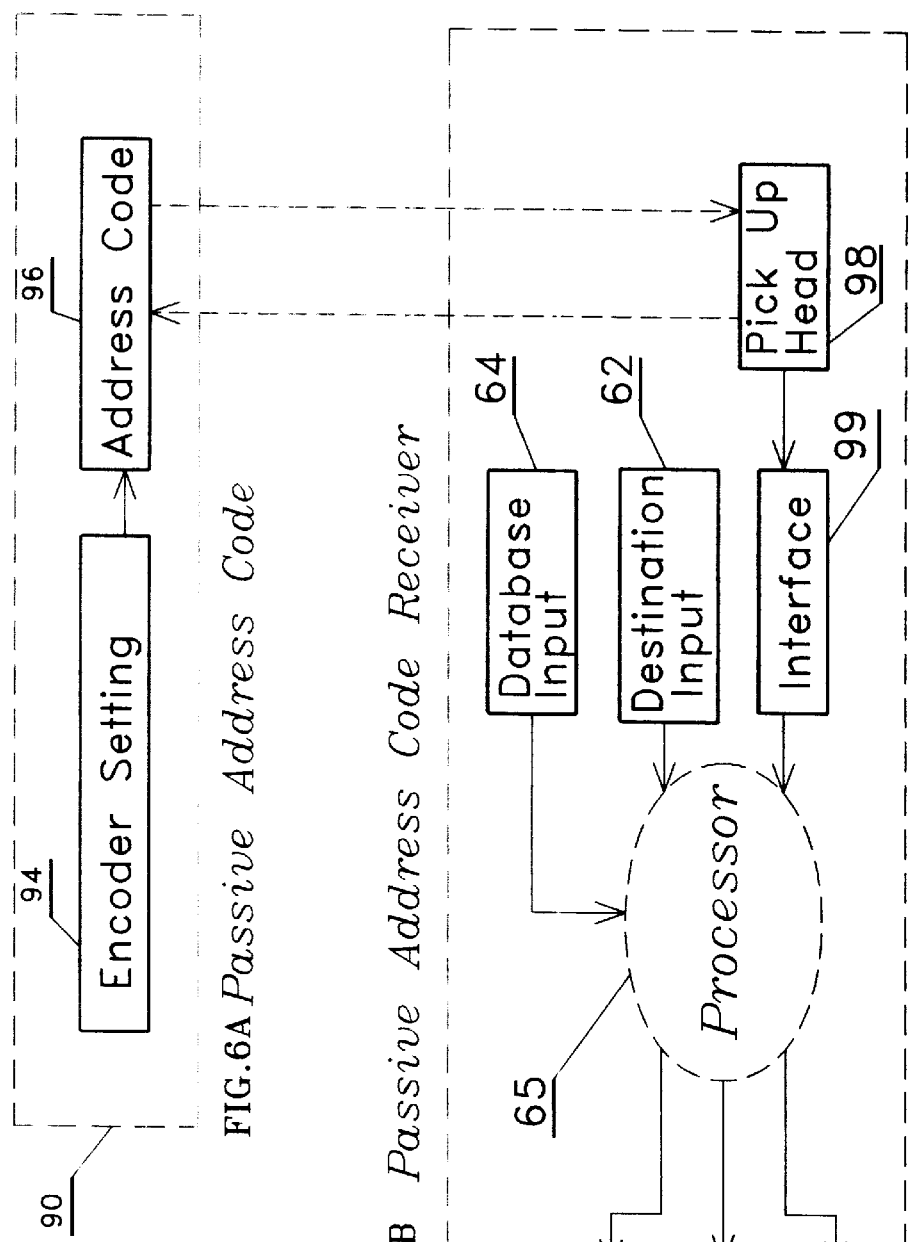
FIG.6A Passive Address Code
FIG.6B Passive Address Code Receiver
FIG.6 Scheme of Principle of Passive Address Code and Receiver FIG. 7  Scheme of Passive Signal Address Code FIG.8 Scheme of Stripe Code

SYSTEM FOR AUTOMATICALLY LOCATING AND DIRECTING A VEHICLE

TECHNICAL FIELD

This invention relates to information digitization technology, general signal emitting and receiving method, data processing technology, and display techniques.

BACKGROUND INFORMATION

Safety and efficiency in transportation are always public concerns, and as a result hundreds of patents are issued annually. This research tries to improve safety and efficiency in transportation in many ways, one of which is using location and navigation systems. The most current research works using navigation systems based on communication with a satellite. This is called GPS (Global Position System). But, GPS is too expensive to be used in the economy vehicle in the near future and its capability is limited.

Some inventions determine vehicle's location by recording and calculating the distance and direction taken by the vehicle and then comparing them with map information. But this is not accurate and reliable compared with the present inventions which solve the problem by setting signal emitters/carriers on the ground or on a fixed object by placing a Receiver in the vehicle to receive the information and determine the exact location.

Usually, a map is needed when one drives to a new place even if he finds a step-by-step route on the Internet because often directions are unclear and hard to follow. This could lead to a possible dangerous situation, not to mention a waste of time. A GPS navigation system can be helpful in locating the vehicle, but it can not be popularized because of its high cost and technological limitations. The Local Position System presented in this paper can not only find out the location and give accurate directions, but it can also easily be applied to all the vehicles within a reasonable cost. When a Receiver carried by the vehicle gets the location signal, it can transmit the signal to other people with corresponding equipment, letting them know the location of the vehicle.

Using this system, a driver can concentrate more on driving than directions therefore the number of accidents should be reduced. Furthermore, the driver wastes less time with easy and constant access to the system. And getting road information from local information source is much cheaper than getting it from satellite. Even though setting up the system originally will take a considerable amount of time, effort, and finances, it only has to be done once.

This invention is especially useful to special vehicle drivers such as police officers, firemen, ambulance or taxi drivers, etc. It can not only help them reach their desired destinations quickly, but can also transmit messages to their headquarters telling of their exact location. In another instance, if a blind person brings a Receiver, he can find the desired destination just following the voice instruction provided by the Receiver. And in the future, this system can be used for automatic drive vehicles.

SUMMARY OF THE INVENTION

A system for automatically locating and directing a vehicle first needs a Receiver which is a microcomputer subsystem connected with a scanner or receiver and/or a transmitter mounted on the vehicle.

The next step is building an information digitization method in which a specific geographic locations in the world are represented by a specified codes. The Address Code which is unique to a specific location point in the world can be picked up on the surface of the cross and accesses of all the roads in each direction in all over the nation through digitally-coded strips or signals emitted from fixed local information source with digitally-coded data. Then the address codes are combined with the current maps in the computer to make a digitized map that can be stored in a compact disk (CD).

Before a vehicle starts the driver inputs his destination, and highlight-route to the destination and a bright spot representing current location of the vehicle and a bight arrow are shown on the screen, these make up the vehicle Receiver. The information displayed tells the driver where he is, and how to get to his desired destination by means of digitized map, words, and voices. The map on the screen can be zoomed in and out so that the driver can know the outline and details of traffic information around him.

When the vehicles move along a road, pass an intersection or turn into another road, the vehicle Receiver can receive the address code by scanning the strips on the surface of the road or receiving the signals of digitally coded data from the emitter mounted near the road. Then the obtained information on the location of the vehicle by the scanner or the receiver will be sent to a microcomputer located the in vehicle Receiver. The microcomputer can automatically display the pertinent area's map on the screen. The current location of the vehicle and the route to destination will be shown as a bright spot and bright arrows. This information can be given to drivers through words or voices, such as "keep straight", "turn left", "turn right" and so on. The bright spot representing the vehicle's location moves along the route displayed in the digitized map on the screen while the vehicle moves on the road because the Receiver will catch the address code one by one on the road and find corresponding information.

When the Receiver gets an address code, the transmitter that is installed inside of Receiver can transmit the newly received signal of the Address Code into the air. This way other people can track the location of the moving vehicle. The transmitter can be set in a cellular phone or radio as well.

BRIEF DESCRIPTION OF THE DRAWINGS

For a more detailed understanding of present invention, reference should be made to the drawings:

FIG. 1 is a flow chart of the invention principle;

FIG. 2 is shown road information content;

FIG. 4 is a flow chart of the active Address Code system;

FIG. 5 is an illustration of the active Address Code system;

FIG. 6 is a flow chart of the passive Address Code system;

DETAILED DESCRIPTION

Figure 3A:
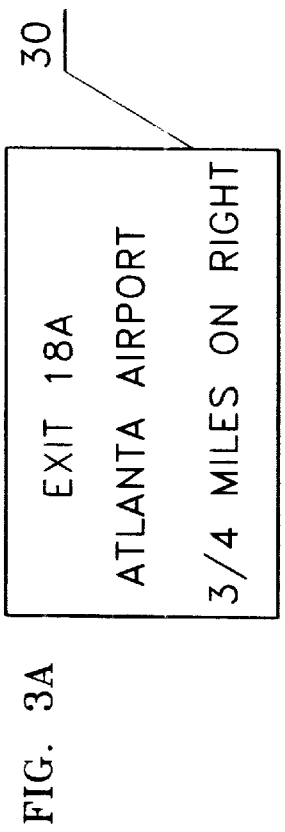
FIG. 3 is a method of digitalization road signals.

The present invention has three main abilities: A system user can know where he is and where he should go, he has access to local information and can let other people know where he is. The present invention has two main features: the system gets information from Address Code emitters or carriers set on a fixed object instead of a satellite, so it is much cheaper than satellite information. And displayed location is reliable and accurate.

The present invention has two main embodiment methods: active and passive methods.

The following is a detailed representation of the ability, feature, and embodiment methods. From FIG. 1, we can see the principles and main procedure of the invention. Block diagram 2 is the process of digitalization and standardization of the road information all over the country. Road information includes not only the current location but also traffic and other helpful information around this point. According to a rule called Digital Standard, we use a series of decimal numbers to represent the road information. The block diagram 6 is constructed Address Code database.

The electronic map 4 and Address Code databases 6 have been combined into a digitized map in which each address has a corresponding code so that this map can not only keep all the functions it has before but also can be searched by the address code created in block diagram 2. The visual/literal/audio information can be shown and upgraded continually according to the new address code received from the local information sources by the Receiver. The digitized map has been installed into storage media then input to microcomputer by means. In FIG. 1, the block diagram 8 indicates this process. The databases can be a map of a city, state, and a whole country or a desired region. Because the database building process is standard, the database is to be accomplished and upgraded.

A very important feature of this invention is the so-called local Address Code. The Address Code database has been installed into microcomputer through storage media as we just mentioned and the Address Code is set up near the road individually. Since each address and other useful information around this location need to be digitized as an address code, a huge number of address codes need to be set up. There are several methods to accomplish it: active and passive Address Code signal. The active Address Code emitter can emit a signal to Receiver but the passive signal Address Code carrier can be recognized and the Address Code can be picked up only when a scanner scans on it. The block diagram 10 indicates the process of setting up all the codes, and block diagram 12 is a scanner or a receiver that belong to said Receiver.

According to their functions three types of traffic signs are classified by Department of Public Safety: regulatory, warning and information or guide signs. The regulatory signs regulate the movement of traffic. They are must be obeyed. For example, YIELD, WRONG WAY, LEFT LINE MUST TURN LEFT, SPEED LIMIT 55 etc. The warning signs are used to warn driver of hazardous conditions ahead requiring him to drive with extra caution, i.e. WINDING ROAD AHEAD, STOP AHEAD, LANE ENDS MERGE LEFT and so on. Information or guide signs: the helpful information includes A HOSPITAL AHEAD, GAS FOOD LODING NEXT RIGHT and so on. Some other information can also be digitized and put in Address Code database.

Since so much information is included in Address Code along the road, we have designed an option button on Receiver to pick up one or more types of signs or information the driver wants to receive. So the most important information can be selected and no other non-necessary road sign will disturb the driver.

According to the option requirement, we have set one digit in the Address Code, called identifiers, to indicate the type of traffic signs. When the option button switch to a position, even though all types of information is picked up, only the selected type of signs can be displayed to the driver and other information will be filtered out because the sign digit does not fit.

After Address Code database has been combined with electronic maps, the databases have been saved into different storage media in certain format according to different region. People can choose the different regional database. For example, we can choose map of New York or Northeastern area map when we are travelling to New York.

The storage media can be chips, CD disk, Floppy disk and so on. It is convenient for users to choose and update the database when it is saved into storage media. A LSP user can choose a digital road information disk just like to choose an atlas, that is very economical and flexible.

There are several points have been taken into account in present invention to set the Address Code along the road:

Distance: in general, from seeing a road sign to making operation, enough distance is required according to the speed limit. In same concern, the Address Code should be set in reasonable distance from an intersection.

If the active signals of Address Code have been applied, the signals must be received clearly and not disturb each other. Power supply must be long lasting.

Passive Address Code carriers must be well protected, easily recognized and re-set.

All Address Code should be stable and effective under all circumstance. For example, active Address Code emitters must have long lasting and replaceable battery or solar battery while passive Address Code should be able to be picked up by Receiver under all climates.

The Receiver consists of the following units: microcomputer 14 that is heart of Receiver with which drivers can read regional map database, key panel 16 for manual inputting destination and other options, a monitor and loudspeaker 18 for displaying received information, and transmitter 20 for sending out the received information into air for other people to know where the vehicle is.

There is a transmitting option switch key on the Receiver. In case the driver wants other people to find his location or track him, he can switch to the transmission key. Then, whenever the Receiver gets an Address Code it will emit the signal through the antenna immediately.

The monitor and/or loudspeaker shows the message provided by the database according to the Address Code received from local Address Code emitters/carriers. With a screen, the driver can get required information through the map of current area with highlighted route from departure to destination and a bright spot representing the vehicle's current location. Since the Address Codes are set discontinuously, the bright spot will jump from the current address to the next address point when the Receiver receives the next Address Code. A bright or another color arrow is used to show the direction he should drive next.

In this invention, a Receiver can be made as series products. A luxury Receiver has full options as we have described above. An economical Receiver may only have a speaker to tell the driver where he is and what is the best way to go next. The Receiver can be made as an individual device or integrated into other devices for example, a radio, cassette, CD player, or a cellular phone. It can be carried on a vehicle, boat or by a person.

MAIN EMBODIMENT

The present invented Local Positioning System comprises of three main development processes: building Address Code databases, which sets the Address Code near a path and developing the Receiver. The embodiment of the development processes is introduced as follows.

Database Establishment

The database comprises two types of databases: electronic map database and Address Code database. Electronic map database, which gives the present invention a reference, has been built a long time before. The digitized map is a combination of the electronic map and address code database, which has all advantages that the electronic map has. But the input method for search area is different. In the new database, a desired address can be searched by inputting a real address, postcode or an automatically received Address Code. Which means an Address Code can be a search key to find out its corresponding address, then a map of this area will be shown on the screen. As the vehicle is moving, new Address Codes will be picked up one by one, then the map shown in the screen will change automatically according to the received code.

The Address Code database is one of the important sections of the present invention. The Address Code is digitized road information that includes real addresses, traffic signs, and helpful information beside the path. The information on the real address of the current location is the first thing we want to know from the address code. It is quicker and more reliable to get location information in this way than through satellites. It is helpful and convenient for driver to get the information on the road and status from the address code too. Even a helpful information something like, "HOSPITAL AHEAD" can be digitized and put in the database.

The built Address Code database is combined with the electronic map and is stored into media storage first. Then the Address Code emitters/carriers can be set up individually on the road for the receivers to pick up the road information.

Figure 3B:
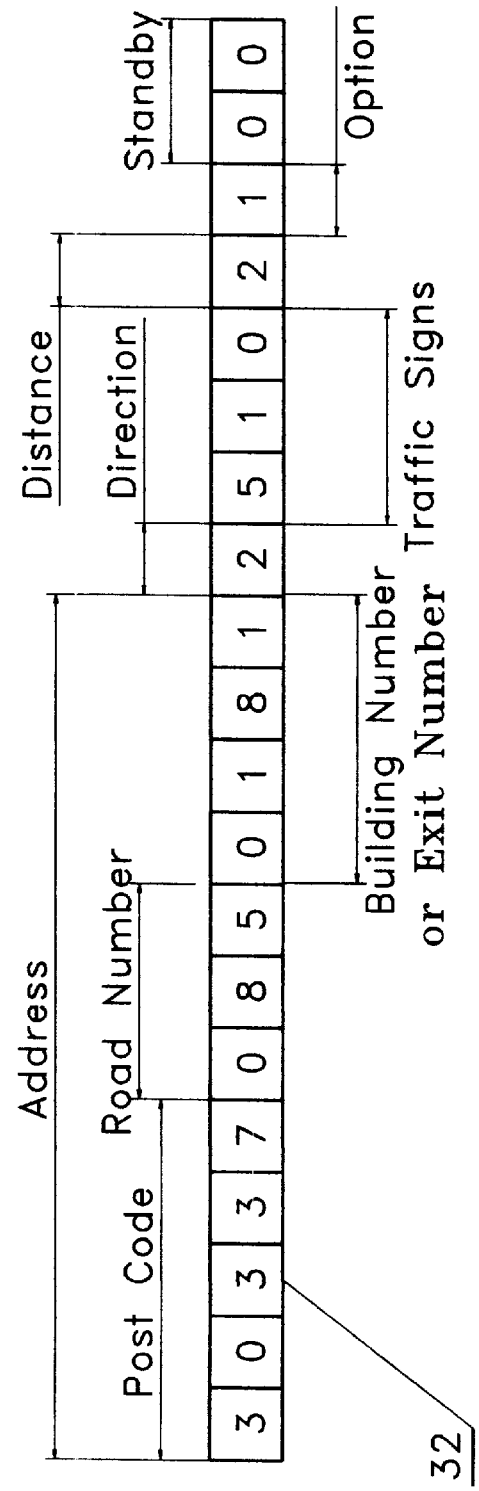

To construct the Address Code database, we need to standardize and digitize not only the real address but also other information like direction, traffic signs, distance and so on. All of this information combined with the address is called Road information, block diagram 29 in FIG. 2. And each piece road information can be digitized as a unique 20-digit number similar to the block diagram 32 in FIG. 3, which is so-called address code. For example, in FIG. 3A, the block diagram 30 is a traffic sign at highway I-85 north, near Atlanta Ga., which means "next exit is 18A, ¾ miles away, keep right to Atlanta Airport". Then we can digitize this information to an address code like block diagram 32 according to FIG. 3B.

The FIG. 2 shows the content of road information, which is contained in each address code:

Real Address

Under the real address, each point on the road has one and only one address to represent it. This includes three parts: post code which is created by US post office throughout the country, street name or highway number and building number or exit number or milestone on the highway. All of them together will tell the location of the vehicle no matter in a city or on the highway.

Direction

When a vehicle is on the road, in order to help it make a decision we have to specify which direction the vehicle is driving to, even though we can find out where it is from the address information.

Traffic Signs

All of three types of signs are included to give traffic information and other useful information.

Distance

The distance between the point where the address code is picked up and the point indicated by the sign.

Option

The digit is the identifiers. The same type of road information has the same type of identifiers. This helps to select or filter the unneeded road information.

Standby

The two digits are reserved for standby. The standby digits are for additional information if necessary later. For, example, one of the digits can be encoded as an advertisement code by motels.

To meet the above six requirements, the address codes represented by 20-digit series numbers are arranged as follows:

The first 5 digits represent postcode, which is the same as the zip code the US post office uses.

The 6th digit represents the direction information:
1—South direction,
2—North direction,
3—East Direction,
4—west direction, The three digits from the 7th to 9th represent a road or street number. For example, 085 represents I-85. 345 represents PEACH STREET.

Digits from the 10th to 12th represent the road signs including the traffic information and other helpful information, i.e.,
001—STOP SIGN,
002—YIELD SIGN
101—SPEEDLIMIT.
102—SHARP TURN TO RIGHT.
598—FOOD NEXT EXIT Digits from the 13th to 16th represent a building number in a city, or a coming exit number or milestone number on the Highway. For example, on I-85:
0181—Exit 18A
0182—Exit 18B The 17th digit represents the distance between the point where the address code is picked up and the point indicated by the sign. For example, when a vehicle has picked up the information of FIG. 3B, the distance between this point to the exit 18A ramp is ¾ mile.
1—½ mile,
2—¾ mile,
3—1 mile,
4—2 miles.

The 18th digit represents an identifiers. For example:
1—Regulatory signs, which must be obeyed,
2—warning signs,
3—information or guide signs,
4—option information, which includes milestone, advertisement.
5—drive suggestion.
6—include all information 1,2,3,4 and 5.

If a user want to find a gas station but doesn't want to know the information on food or any other traffic information, he just needs to enter choice 3. Then only the information with the gas station will be showed to him. If he enters 1, only the regulatory signs can be displayed, no other information will bother the user.

The 19 and 20th digits are empty digits for standby.

When encoding an Address Code, if some digits have no suitable number, it will be filled with a 0 as default. For example, highway 85 will be coded as 085 in the 7th to 9th digits.

According to this rule, in FIG. 3, the road sign 30 can be digitized to block diagram 32.

Active Address Code System Embodiment

In order to set up an Address Code on a local fixed object, two types of signals can be employed: active signal and passive signal. The active signal equipment (Address Code emitter) emits the digitized signals that can be received by the Receivers on vehicles. The principle of the active Address Code system is illustrated in FIG. 4, where the dashed block 52 represents Address Code emitter and dashed block 54 represents the Receiver that can catch the address code emitted from the emitters.

Dashed block diagram 52 characterized how the address code emitter is set and how it works, See FIG. 4A.

Block diagram 40 indicates a process setting digitized road information, which is a 20-digit number. There are various methods to fulfill this work, i.e. scanning, dial switch setting, and keyboard inputting. When a scanner scans an Address Code emitter, the number which was inputted to the scanner will be encoded into the emitter. Or a 20-digit dial switch has been set in every Address Code emitter. To input an Address Code, set the 20-digit dial switch one by one according to a predetermined number. The third way to encode an emitter is just typing the address code into it directly.

According to the encoded number, signal generator 42 generates signals that represent the number to modulator 46, during the meantime, a vibrator 44 sends a carrier wave to modulator 46. Then the signals are sent to transmitter 48. After that, the signals will be sent to the surrounding area continuously through emitting antenna 50.

Before encoded, all Address Code emitters are homogeneous products, which can be shaped differently to fit different situations. Because Address Code emitters are made in tremendous numbers in manufacturing factories, the average cost is low. A solar battery or high efficiency battery has been chosen for the Address Code emitter as a power supply when other power sources are not available.

The active signal Address Code can be installed on an existing traffic signboard as showed in FIG. 5. Therefore, installing work will be reduced. The Address Code emitters 52 are set upon the road signboards 80 or 82 and emit its signal in a reasonable space. In FIG. 5, the relative road marks the items, such as edge lines 81, broken lines 83, centerline 89, frames of signboard 84 and 85, directions guides marks 87 have been shown. When a Receiver 54, which is carried by vehicle 88, moves close to Address Code emitter 52, the signal will be caught by the Receiver.

FIG. 4B is the flow chart of an active signal Receiver. The dashed block diagram 54 indicates an active signal Receiver, which has receiving antenna 56, amplifier 58, demodulator 60, destination input 62, database input 64, processor 65, transmitter 66, loudspeaker 68 and monitor 70.

In general, a Receiver is loaded on a vehicle, when an active signal Receiver is close to an active signal Address Code emitter, the signals that are emitted by the Address Code emitter will be caught. Then the signal will be amplified by amplifier 58, demodulated by demodulator 60 and sent to a microcomputer 65. A database can be stored in the computer, and a destination can be inputted to the computer.

The microcomputer has a memory unit to store the database, and a key panel for inputting a desired destination, option or other operation. An important function of the computer is the search function. When a signal is received from local road information system and converted to an address code, the computer can search its database based on the received address code then find out where the current vehicle is. Furthermore, according to the inputted destination and the search key, the computer will find the best route or direction. The computer will show a regional map centered on the current location of the vehicle. Along with the moving vehicle, a new road signal will be caught and the search key will be updated. Then a new map and route from the current location to the desired destination will be displayed. The driver will not get lost on the road.

A liquid crystal monitor is employed to display the visual information including current location, a regional map centered on the current point, a highlighted route to the destination, bright spot representing the current location, and a bright arrow pointing to the direction to go next. On the monitor, additional s rows of words will briefly show the current address and where to go next. Voice messages will be provided through loudspeaker too if preferred.

If a driver wants to let other people know where he is, the transmitter 66 can emit a signal just like what he received to the current point so that they can track the vehicle on real time.

The Receiver can be a separated device set on some convenient place for a vehicle driver to check. Also, it could be combined with other devices. For example, it can be combined with the car-radio or mobile phone.

Passive Address Code System Embodiment

A main difference of the passive Address Code carrier and active Address Code emitter is that the passive Address Code carrier cannot emit signals to the Receiver. The Address Code on a passive Address Code carrier can be picked up only when Receivers scan on it. A Receiver for passive Address Code system is different from the active signal Receiver too.

The FIG. 6 describes the passive address code system, which includes a address code carrier and Receiver. A dashed block 90 represents the Address Code carrier and the dashed block 92 is passive the Address Code Receiver, in which destination input 62, database input 64, processor 65, transmitter 66, loudspeaker 68, monitor 70 are same as that in active address code Receiver.

Dashed diagram 92 is the flow chart of a passive Address Code Receiver. First, the pick up head 98 scans the Address Code carrier to get a signal. This will be converted to an address code by an interface 99, then sent to a processor 65. The following steps are the same as that in the active Receiver.

Figure 7A:
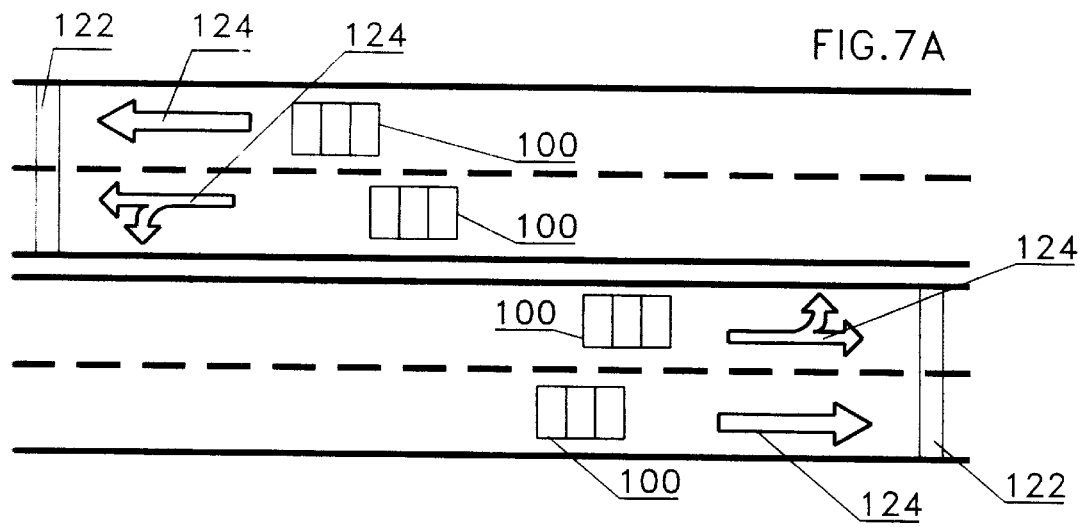
FIG. 7 is an illustration of the passive Address Code system.
Figure 7B:
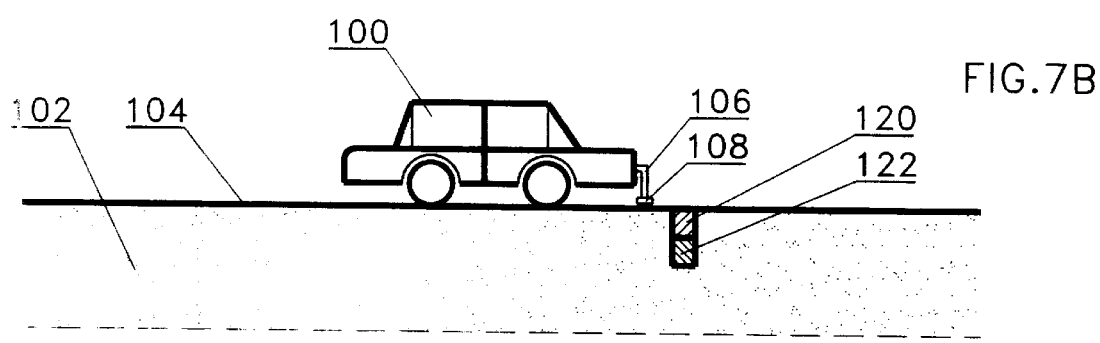

The passive Address Code carriers are not as complicated as an address code emitters. In FIG. 7, the embodiment of the Address Code carrier is shown. An encoded magnetic tape can be a passive Address Code. The FIG. 7A is overview of a road. FIG. 7B is a cross-section view along the road. The magnetic tape 122, protected by a cover layer 120, is buried in the roadbed 102 perpendicular to the vehicle's running direction,. There are cables inside the flexible rod 106 connecting the pick-up head 108 and the Receiver, which is set inside the vehicle.

Figure 7C:
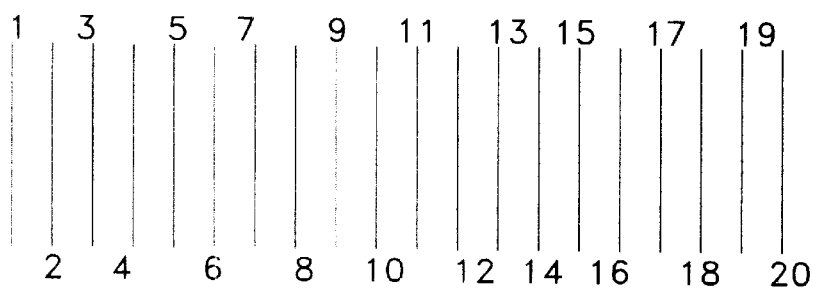

FIG. 7C is an enlarged view of a magnetic tape 122, in which twenty narrow channels are arranged. Each channel is encoded as a decimal number, the 20-digit number represents road information. The tape is made of Nd—Fe—B strong magnet materials. When a magnetic encoder scans on the tape, the tape will be magnetized and an Address Code is set on it. When a pick up head 108 scans upon the tape, it will pick up the magnetic signal.

Figure 8A:
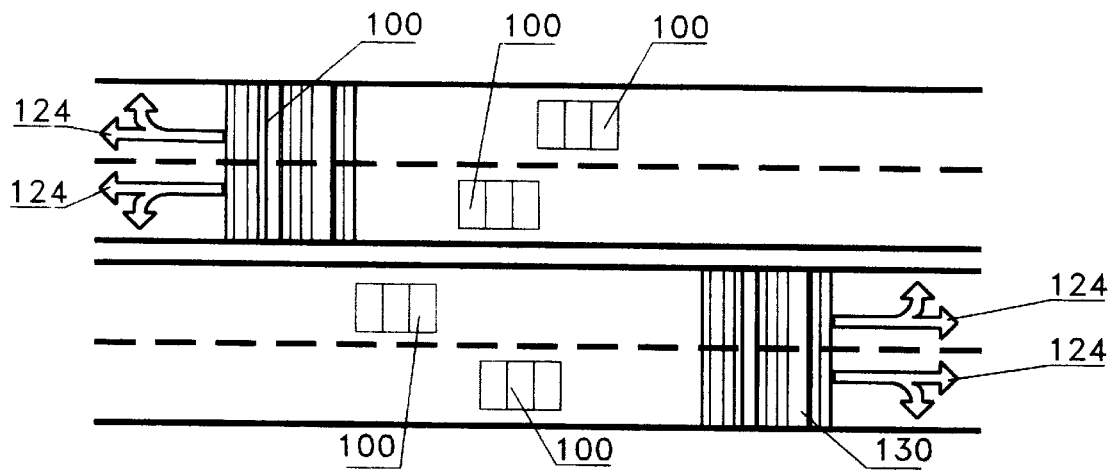
FIG. 8 is a schematic diagram of a stripe code Address Code system.
Figure 8B:
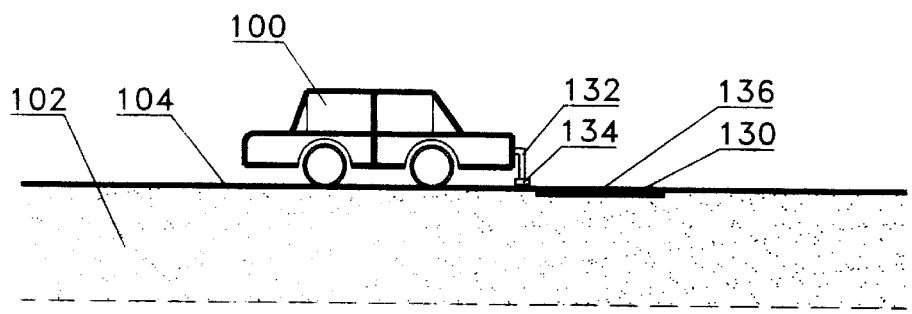

In FIG. 8, another passive Address Code setting method is introduced. The principle is most similar to the system explained in FIG. 7. The magnetic tape is substituted by a special stripe. The FIG. 8A is an overview of the setting; the FIG. 8B is the cross-section of the setting along a road. Stripe code 130 represents a digitized road information.

Stripe code is widely used in identifying products in supermarket. A series of stripes can represent a unique multi-digit number that can be an Address Code based on different stripe width and different distances between stripes.

The stripes are printed in a different color on the road surface. They are in white or yellow, and covered by a transparent thin cover 136 to protect the stripe codes. The pick up head of the passive Address Code Receiver will scan the stripe code and pick up the information when the vehicle is driven through it. Then the scanner converts and sends the road information to the computer to find the detailed information as described above.

Scanner head 134 is connected to the flexible rod 132 which hangs on the vehicle to ensure that the head is close to road surface 104 but will not hit on the road. Rod 132 and head 134 are adjustable or removable.

When a device that is called Receiver is closed to the signal sources, an Address Code can be picked up from the Address Code emitter or carrier by various means. Then the signal will be converted to a certain code format by means and sent to a computer. In the microcomputer, received Address Code is searched in stored database to locate the current position of the vehicle. Combining the current location and pre-inputted destination, the computer can provide visible and/or audible messages to the receiver user. Therefore, the user will know where he is and/or what the best direction he should take to the desired destination and/or let other people track the vehicle if he wants.

What is claimed is:

1. LPS (Local Position System), apparatus for navigation based on receiving signals from signal sources which are installed on local objects, comprising:
   (a) address code emitter or carriers means for sending or carrying signals by means to be picked up by moving objects, said signals indicating corresponding road information which are digitized as multi-digit numbers under standard rules; and
   (b) databases for storing any road information and digitized electronic maps, said road information is straightforward converted to a multi-digit number which is defined under standard rules; and
   (c) a receiver system mounted on moving objects, said receiver system including:
      (1) a memory unit for storing the said databases of said digitized road information by means; and
      (2) a control panel for inputting desired destination and options to show desired type of information; and
      (3) a pick up device for receiving said signals from said signal emitter or carrier by means; and
      (4) a computer for decoding received said signals to extract said digitized road information from said signals, and for processing said digitized road information to search said database and determine current position, traffic situation and said road information of said moving objects and find the best route and direction to the desired destination; and
      (5) a display device and/or a loudspeaker for showing the user current location as a spot, regional map and the best route and next direction using arrows or different color of lines; and
      (6) a transmitter for emitting said received signal by various means into air for other peoples who want to know where the user is;
   said moving objects including a vehicle, boat, person and any movable objects; said receiver being made into an individual box or built into radio, CD player, and cellular phone by various means;
   said address code emitter or carrier including plurality of signal sources set on fixed object by means.

2. LPS navigation system according to claim 1 wherein said fixed object includes existing road signboard, road guardrail, navigation mark, buoy, beacon, and any other objects near the road area on ground /water surface or underground.

3. LPS navigation system according to claim 1 wherein said road information includes current address information, traffic information and other useful information shown on both sides of any path, said current address information including post code, street number, direction, building number and so on, said traffic information including any traffic signs at current point.

4. LPS navigation system according to claim 1 wherein said local signal sources sets local information by using an Address Code emitter or an Address Code carrier or their combination.

5. LPS navigation system according to claim 4 wherein said the address code emitter includes the signal generator that can emit road information code into surrounding area, said signals including electronic, magnetic, optic, acoustic signal or their combination by various means.

6. LPS navigation system according to claim 4 wherein said the address code carrier can be a predetermined geometry shape or different color or permanent magnetic field, representing said road information code, which can be picked up by said receiver by various means when it is close to or scans on the address code carriers.

7. LPS navigation system according to claim 5 or 6 wherein said road information code are multi-digit number defined according to specific road information under standard rules in LPS system, said road information codes storing in address code emitter or carriers.

8. LPS navigation system according to claim 6 wherein said predetermined geometry shapes can be set into the strip code by means and said magnetic field can be constructed and comprised of a series of magnetic tapes representing said road information code by various means.

9. LPS navigation system according to claim 8 wherein said predetermined geometry shapes and magnetic field can be protected by reprinting or re-magnetizing and other means.

10. LPS navigation system according to claim 1 wherein said search method includes all methods for searching a digitized electronic map by received address code from local address code emitters or carriers.

11. LPS navigation system according to claim 1 wherein said pick up device includes scanner for scanning the signals from said address code carriers, or an antenna to receive an active signal from said address code emitters.

12. LPS navigation system according to claim 1 wherein said receiver can be made as a separated box, or integrated with other devices in the vehicle, i.e. radio, cassette, CD player or cellular-phone by various means.

13. LPS navigation system according to claim 1 wherein said option function on said receiver are used for selecting the preferred type of traffic information, i.e. regulatory signs, warning signs or information signs by means.

14. LPS navigation system according to claim 1 wherein said databases of digitized electronic maps can be searched automatically by received address code and updated by searching next local Address Code on real time.

15. LPS navigation system according to claim 1 wherein said receiver comprises a display device and/or a loudspeaker for showing the user current location, regional map and said best route and direction to desired destination based on received said road information code.

16. LPS navigation system according to claim 1 wherein said spot is used to represent the current vehicle location and will move to the corresponding point when it receives the next address code.

* * * * *